(12) United States Patent
Watanabe et al.

(10) Patent No.: US 7,527,411 B2
(45) Date of Patent: May 5, 2009

(54) LIGHTGUIDE PLATE OF A DOUBLE-SIDED ILLUMINATION BACKLIGHT AND A DOUBLE-SIDED LIQUID CRYSTAL DISPLAY UNIT USING THE BACKLIGHT

(75) Inventors: Kiyokazu Watanabe, Fujiyoshida (JP); Junji Miyashita, Fujiyoshida (JP)

(73) Assignee: Citizen Electronics Co., Ltd., Yamanashi-Ken (JP)

( * ) Notice: Subject to any disclaimer, the term of this patent is extended or adjusted under 35 U.S.C. 154(b) by 212 days.

(21) Appl. No.: 11/709,612

(22) Filed: Feb. 22, 2007

(65) Prior Publication Data

US 2007/0217227 A1    Sep. 20, 2007

(30) Foreign Application Priority Data

Feb. 22, 2006    (JP)    ............... 2006-045452

(51) Int. Cl.
*F21V 33/00* (2006.01)
(52) U.S. Cl. .................. 362/616; 362/602; 362/625; 362/626
(58) Field of Classification Search ................. 362/602, 362/616, 625, 626, 623, 624, 627, 561
See application file for complete search history.

(56) References Cited

U.S. PATENT DOCUMENTS 6,167,182 A    12/2000    Shinohara et al.

(Continued)

FOREIGN PATENT DOCUMENTS

JP    H09-081048    3/1997

(Continued)

*Primary Examiner*—Laura Tso
(74) *Attorney, Agent, or Firm*—Brinks Hofer Gilson & Lione (57) ABSTRACT

A double-sided emitting backlight unit has a first light-emitting surface for illuminating a first liquid crystal display panel disposed to face the first light-emitting surface, a second light-emitting surface provided parallel to the first light-emitting surface to illuminate a second liquid crystal display panel that is smaller than the first liquid crystal display panel and disposed to face the second light-emitting surface, and a peripheral surface extending between the first and second light-emitting surfaces and each groove having a light-receiving surface that receives light from a light source. The second light-emitting surface is a prism surface provided with a multiplicity of grooves extending parallel to the light-receiving surface and having a triangular section. The grooves in a part of the second light-emitting surface that corresponds to the second liquid crystal display panel in a direction perpendicular to the light-receiving surface are larger than the grooves in the rest of the second light-emitting surface in terms of at least one factor selected from among the following: the depth of the grooves; the angle between the second light-emitting surface and an inclined surface of each groove extending from the second light-emitting surface to the apex of the triangular section in a direction away from the light-receiving surface; and the number of grooves per unit length in the direction perpendicular to the light-receiving surface. With this configuration, the quantity of light per unit area emitted from a part of the first light-emitting surface corresponding to the second liquid crystal display panel is larger than that emitted from the rest of the first light-emitting surface.

10 Claims, 6 Drawing Sheets

U.S. PATENT DOCUMENTS

| | | |
|---|---|---|
| 6,791,638 B2 | 9/2004 | Miyashita et al. |
| 7,001,059 B2 * | 2/2006 | Han et al. .................... 362/616 |
| 7,048,428 B2 | 5/2006 | Tahara et al. |
| 7,118,264 B2 * | 10/2006 | Tseng et al. ................ 362/561 |
| 7,123,318 B2 | 10/2006 | Nagakubo et al. |
| 2006/0114692 A1 * | 6/2006 | Han et al. ................... 362/616 |
| 2006/0262565 A1 * | 11/2006 | Shimura ..................... 362/616 |

FOREIGN PATENT DOCUMENTS

| | | |
|---|---|---|
| JP | 2004-53665 | 2/2004 |
| JP | 2004-69879 | 3/2004 |
| JP | 2005-353406 | 12/2005 |

* cited by examiner

LIGHTGUIDE PLATE OF A DOUBLE-SIDED ILLUMINATION BACKLIGHT AND A DOUBLE-SIDED LIQUID CRYSTAL DISPLAY UNIT USING THE BACKLIGHT

This application claims priority under 35 U.S.C. §119 to Japanese Patent application No. JP2006-045452 filed Feb. 22, 2006, the entire content of which is hereby incorporated by reference.

TECHNICAL FIELD

The present invention relates to a backlight unit for illuminating liquid crystal display devices provided on both the front and back sides of a cellular phone, a personal digital assistant (PDA), etc. More particularly, the present invention relates to a lightguide plate for use in the backlight unit.

BACKGROUND ART

Figure 9:
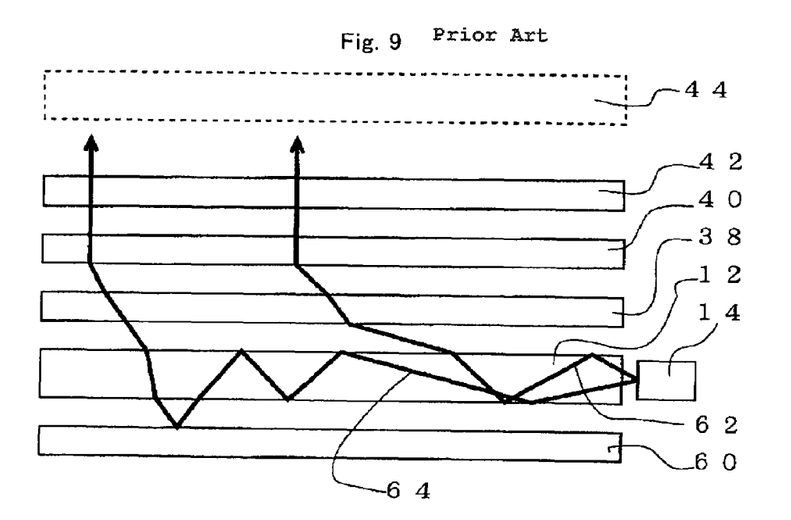
FIG. 9 is a diagram illustrating a backlight unit for illuminating a liquid crystal display panel to which the present invention relates.

FIG. 9 is a diagram showing an example of a conventional backlight unit for illuminating a liquid crystal display panel.

In FIG. 9, light 62 and 64 emitted from a light source 14 made up of LEDs (Light-Emitting Diodes), for example, advances through a lightguide plate 12 while repeating reflection therein. While advancing, some light 62 is reflected to exit the upper surface of the lightguide plate 12 by grooves provided on the bottom of the lightguide plate 12. The light 62 exiting the lightguide plate 12 is diffused by a diffuser sheet 38 and then passed through prism sheets 40 and 42 so as to be incident perpendicularly on a liquid crystal display panel 44.

Some light 64 exits the lower surface of the lightguide plate 12, but it is reflected by a reflective sheet 60 back into the lightguide plate 12. Thereafter, the light 64 exits the upper surface of the lightguide plate 12 to illuminate the liquid crystal display panel 44 in the same way as the light 62.

The diffuser sheet 38 is used to diffuse light so as to illuminate the liquid crystal display panel 44 uniformly. It is required in order to illuminate the liquid crystal display panel 44 even more uniformly that the lightguide plate 12 should also emit light uniformly over the whole light-emitting surface thereof.

Japanese Patent Application Publication No. 2004-69879 proposes a technique wherein a light-emitting surface of a lightguide plate is provided with ridges having a triangular section such that the pitch of the ridges decreases with ridges being situated farther away from the associated light source increases, thereby making the brightness uniform over the entire light-emitting surface of the lightguide plate.

The proposed technique is, however, for a unit adapted to illuminate only a liquid crystal display device provided at the front side of a lightguide plate. It is not suitable for a unit that illuminates liquid crystal display devices provided at both the front and back sides of a lightguide plate.

Japanese Patent Application Publication No. 2004-144990 discloses a double-sided emitting backlight unit that illuminates both a large first liquid crystal display panel provided on the front side of the backlight unit and a small second liquid crystal display panel provided on the back side thereof. In this backlight unit, a semitransmitting reflector is provided on the back side thereof, and an opening is provided in a portion of the semitransmitting reflector corresponding to the second liquid crystal display panel to pass light from a lightguide plate to the second liquid crystal display panel. The rest of the semitransmitting reflector transmits part of light and reflects the remaining light toward the first liquid crystal display panel.

With this backlight unit, therefore, light transmitted through the part of the semitransmitting reflector other than the opening is wasted, resulting in a degradation of the backlight utilization efficiency. If a reflecting member is provided over an area where the second liquid crystal display panel is not present to reflect substantially all light directed to this area back toward the first liquid crystal display panel with a view to effectively utilizing light, the intensity of illuminating light becomes lower in a region of the first liquid crystal display panel that corresponds to the second liquid crystal display panel than in the rest thereof, causing luminance unevenness on the first liquid crystal display panel.

SUMMARY OF THE INVENTION

An object of the present invention is to solve the problems with the double-sided emitting backlight unit.

That is, the present invention provides a lightguide plate for a double-sided emitting backlight unit. The lightguide plate has a first light-emitting surface for illuminating a first liquid crystal display panel disposed to face the first light-emitting surface, a second light-emitting surface opposite to the first light-emitting surface to illuminate a second liquid crystal display panel that is smaller than the first liquid crystal display panel and disposed to face the second light-emitting surface, and a peripheral surface extending between the first light-emitting surface and the second light-emitting surface and having a light-receiving surface that receives light from a light source. The second light-emitting surface is provided with a multiplicity of grooves extending parallel to the light-receiving surface and each having a triangular section. The grooves in a part of the second light-emitting surface corresponding to the second liquid crystal display panel are set different in configuration from the grooves in the rest of the second light-emitting surface, whereby the quantity of light per unit area emitted from a part of the first light-emitting surface corresponding to the second liquid crystal display panel is larger than from the rest of the first light-emitting surface.

With this lightguide plate for a double-sided emitting backlight unit, even when the reflector described in paragraph [0009] is provided, the quantity of light emitted from the first light-emitting surface can be adjusted to be uniform over the entire area thereof by setting the grooves provided on the second light-emitting surface as stated above.

Specifically, the grooves may be set so that the grooves in the part of the second light-emitting surface corresponding to the second liquid crystal display panel are deeper than the grooves in the rest of the second light-emitting surface.

In another specific example, the grooves may be set so that the angle formed between an inclined surface of each groove extending from the apex of the triangular section toward the light-receiving surface and the second light-emitting surface is larger in the part of the second light-emitting surface corresponding to the second liquid crystal display panel than in the rest of the second light-emitting surface.

In still another specific example, the grooves may be set so that the number of the grooves per unit length in a direction away from the light-receiving surface is larger in the part of the second light-emitting surface corresponding to the second liquid crystal display panel than in the rest of the second light-emitting surface.

In a further specific example, the grooves may be arranged in a configuration selected from among the following: a configuration in which the grooves are deeper and the inner angle of each groove formed between an inclined surface of each groove extending from the apex of the triangular section toward the light-receiving surface and the second light-emitting surface is larger in the region of the second light-emitting surface corresponding to the second liquid crystal display panel than in the rest of the second light-emitting surface; a configuration in which the grooves are deeper and the number of the grooves per unit length in a direction away from the light-receiving surface is larger in the region of the second light-emitting surface corresponding to the second liquid crystal display panel than in the rest of the second light-emitting surface; a configuration in which the inner angle of each groove formed between an inclined surface of each groove extending from the apex of the triangular section toward the light-receiving surface and the second light-emitting surface and the second light-emitting surface is larger and the number of the grooves per unit length in a direction away from the light-receiving surface is larger in the region of the second light-emitting surface corresponding to the second liquid crystal display panel than in the rest of the second light-emitting surface; and a configuration in which the grooves are deeper and the angle formed between an inclined surface of each groove extending from the apex of the triangular section toward the light-receiving surface and the second light-emitting surface is larger and further the number of the grooves per unit length in a direction away from the light-receiving surface is larger in the region of the second light-emitting surface corresponding to the second liquid crystal display panel than in the rest of the second light-emitting surface.

In addition, the present invention provides a liquid crystal display apparatus adopting any of the above-described lightguide plates for a double-sided emitting backlight unit.

DETAILED DESCRIPTION OF THE PREFERRED EMBODIMENTS

Embodiments of the present invention will be described below with reference to the accompanying drawings.

FIGS. 1a to 1d show embodiments of a lightguide plate according to the present invention.

As shown in the figures, lightguide plates 12 according to these embodiments have grooves 16 each with a triangular section formed on bottom surfaces of the lightguide plates.

The grooves 16 will be explained below by using FIG. 2.

Figure 2:
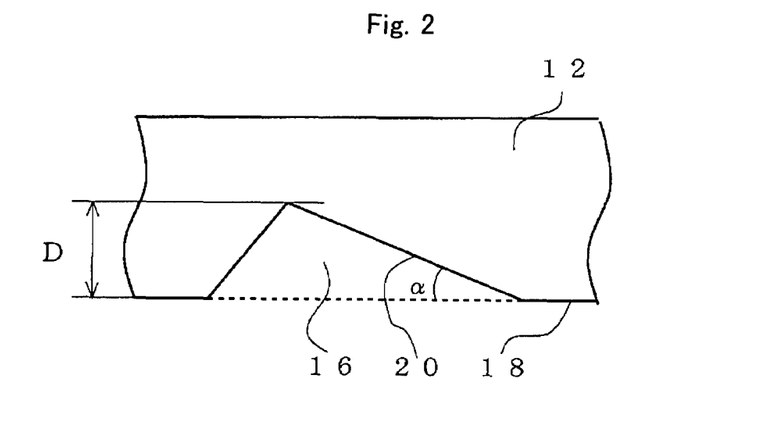
FIG. 2 is an enlarged view of a groove provided on a surface of a lightguide plate.

In FIG. 2, light travels through the lightguide plate 12 from the right toward the left. The quantity of light emitted to the outside from the upper surface (light-emitting surface) of the lightguide plate 12 increases in proportion to the increase of the angle α between the bottom surface 18 of the lightguide plate 12 and a side 20 of the groove 16. The quantity of light emitted out from the light-emitting surface also increases in proportion to the increase of the number of grooves 16 per unit length in a direction away from a light source 14 (hereinafter referred to simply as "the per-unit number of grooves 16"), and also as the depth D of the grooves 16 increases.

Figure 3:
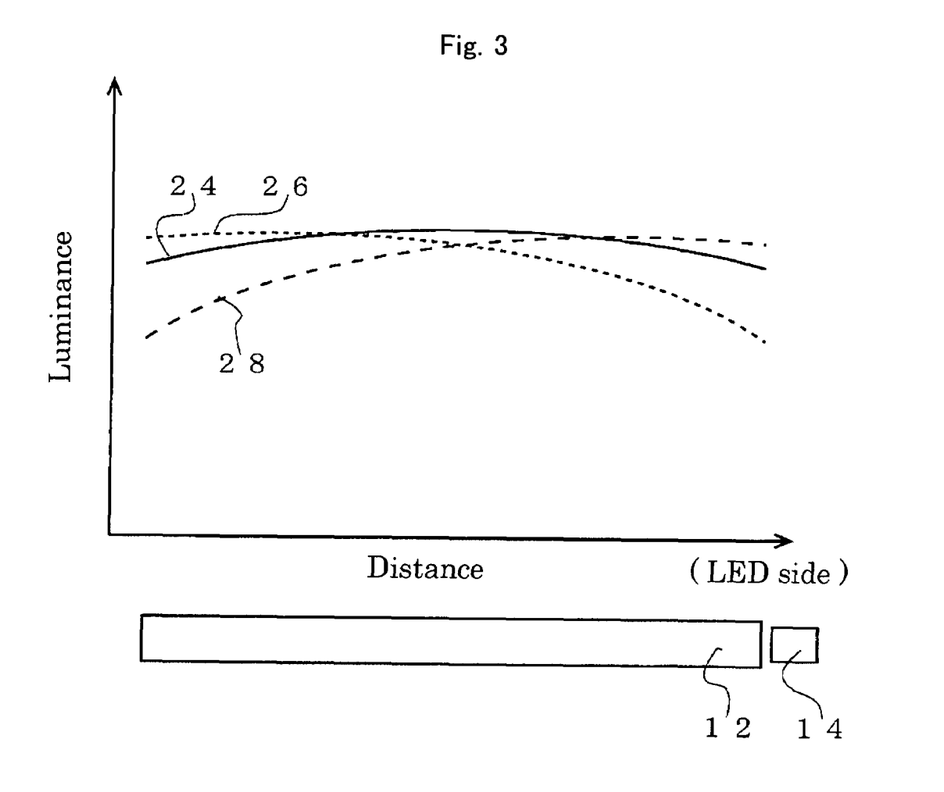
FIG. 3 is a diagram showing the luminance distribution on a light-emitting surface of a lightguide plate.

FIG. 3 is a diagram showing the luminance distribution on the light-emitting surface of the lightguide plate 12 provided with the grooves 16. The ordinate axis represents the luminance and the abscissa axis the distance from the light source 14.

Curve 24 shows a favorable luminance distribution that is set so that the luminance is highest in the center of the liquid crystal display and becomes slightly lower as the distance from the center increases toward the periphery of the liquid crystal display.

Curve 26 shows a luminance distribution that is obtained when the per-unit number of grooves 16 and the depth D thereof are the same as the conditions for obtaining the luminance distribution of curve 24 but the angle α of the grooves 16 is set smaller than in the case of curve 24, for example. In this case, the quantity of light emitted from the light-emitting surface by each individual groove 16 decreases. Therefore, the quantity of light from the light source 14 that travels through the lightguide plate 12 toward the inner part thereof (leftward in the figure) increases. Hence, the closer to the light source 14, the darker, and the farther from the light source 14, the brighter, in comparison to curve 24. Such a luminance distribution can also be obtained when the per-unit number of grooves 16 or the depth thereof is reduced and the other conditions are the same as in the case of obtaining the luminance distribution represented by curve 24.

Curve 28 shows a luminance distribution obtained when the per-unit number of grooves 16 and the depth D thereof are the same as the conditions for obtaining the luminance distribution of curve 24 but the angle α of the grooves 16 is set larger than in the case of curve 24, for example. In this case, the quantity of light emitted from the light-emitting surface by each individual groove 16 increases. Therefore, the quantity of light from the light source 14 that travels through the lightguide plate 12 toward directions away from the light source 14 (leftward in the figure) decreases. Hence, the closer to the light source 14, the brighter, and the farther from the light source 14, the darker, in comparison to curve 24. Such a luminance distribution can also be obtained when the per-unit number of grooves 16 or the depth thereof is increased and the other conditions are the same as in the case of obtaining the luminance distribution represented by curve 24.

Figure 1A:
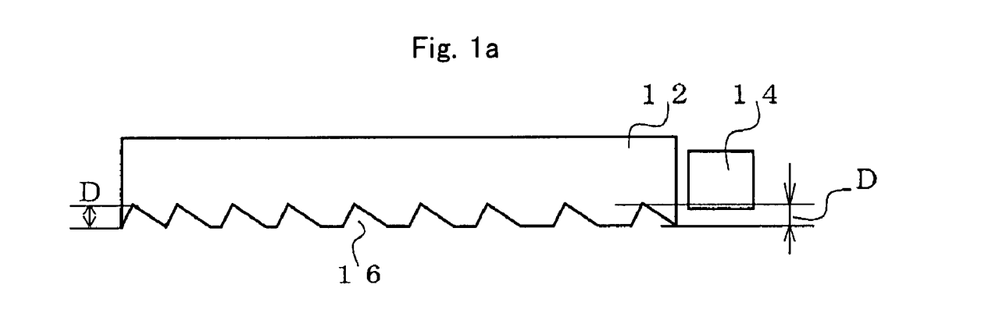
FIG. 1a is a side view of a lightguide plate according to a first embodiment of the present invention.

In FIG. 1a, the angle α and depth D of the grooves 16 are fixed, and the per-unit number of grooves 16 is increased with increase in the distance from the light source 14. The quantity of light traveling through the lightguide plate 12 decreases with increase in the distance from the light source 14, but it is possible to obtain a luminance distribution substantially similar to that represented by curve 24 in FIG. 3 because the per-unit number of grooves 16 is set as stated above.

Figure 1B:
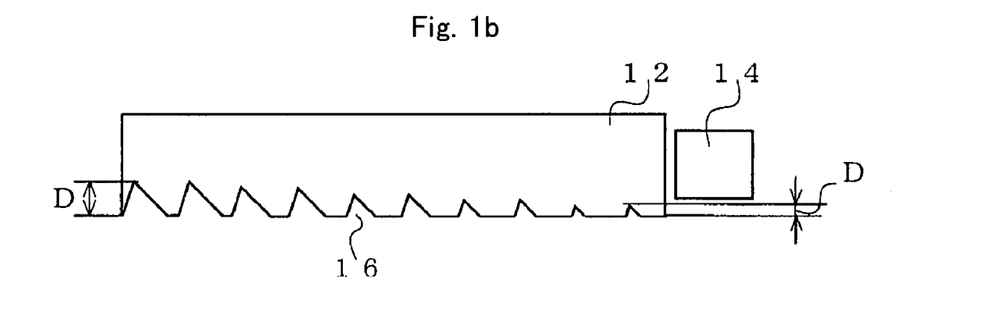
FIG. 1b is a side view of a lightguide plate according to a second embodiment of the present invention.

FIG. 1b shows an example in which the angle α and per-unit number of grooves 16 are fixed, and the depth D of the grooves 16 is increased with increase in the distance from the light source 14. With this configuration, it is possible to set a luminance distribution as shown by curve 24 in FIG. 3.

Figure 1C:
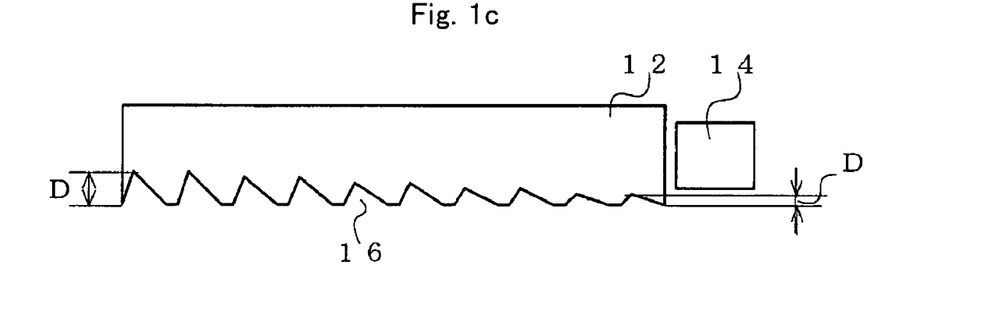
FIG. 1c is a side view of a lightguide plate according to a third embodiment of the present invention.

FIG. 1c shows an example in which the per-unit number of grooves 16 is fixed, and the depth D and angle α of the grooves 16 are increased with increase in the distance from the light source 14. The configuration shown in FIG. 1c also enables the luminance distribution to be as shown by curve 24 in FIG. 3. Because two factors, i.e. the depth D and angle α of the grooves 16, are both varied in this example, the luminance distribution can be controlled even more appropriately.

Figure 1D:
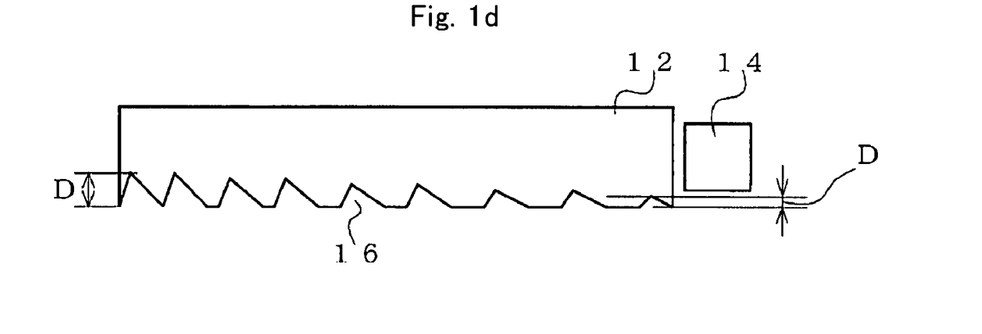
FIG. 1d is a side view of a lightguide plate according to a fourth embodiment of the present invention.

FIG. 1d shows an example in which all the three factors are varied. That is, the per-unit number of grooves 16 and the depth D and angle α of the same are increased with the grooves being situated farther away from the light source 14. The configuration shown in FIG. 1d also enables the luminance distribution to be as shown by curve 24 in FIG. 3. Because all the three factors are varied in this example, the luminance distribution can be controlled most efficiently.

There are 7 different combinations of varying the three factors, i.e. the per-unit number, depth D and angle α of the grooves 16. Advantageous effects similar to those in the above-described examples can also be produced by any of the following additional three combinations (not shown in the figures): (a) the per-unit number and depth D of the grooves 16 are fixed and the angle α thereof is varied; (b) the depth D of the grooves 16 is fixed and the per-unit number and angle α thereof are varied; and (c) the angle α of the grooves 16 is fixed and the per-unit number and depth D thereof are varied.

Ridges may be provided in place of the grooves 16 to bring about a luminance distribution control similar to the above.

If the quantity of light from the light source 14 that enters the lightguide plate 12 and exits from the side opposite to the light source 14 increases, light utilization efficiency degrades. In this regard, in accordance with the present invention, the grooves 16 can be appropriately adjusted so as to minimize the quantity of light exiting from the opposite side of the lightguide plate 12.

Other embodiments of the present invention will be described below with reference to FIGS. 4 to 8.

Figure 4:
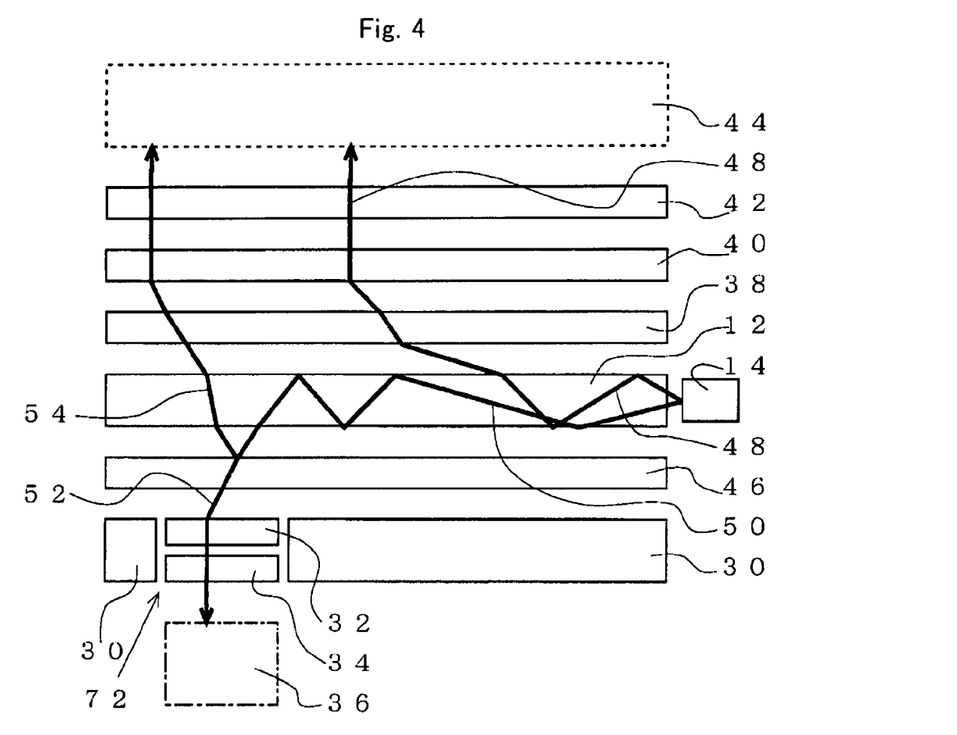
FIG. 4 is a diagram illustrating an outline of a double-sided emitting backlight unit using a lightguide plate according to the present invention.

FIG. 4 is a sectional view illustrating an outline of a liquid crystal display apparatus according to the present invention arranged to illuminate both a main liquid crystal display panel 44 and a sub-liquid crystal display panel 36, which are provided on the front and back sides, respectively.

Figure 6:
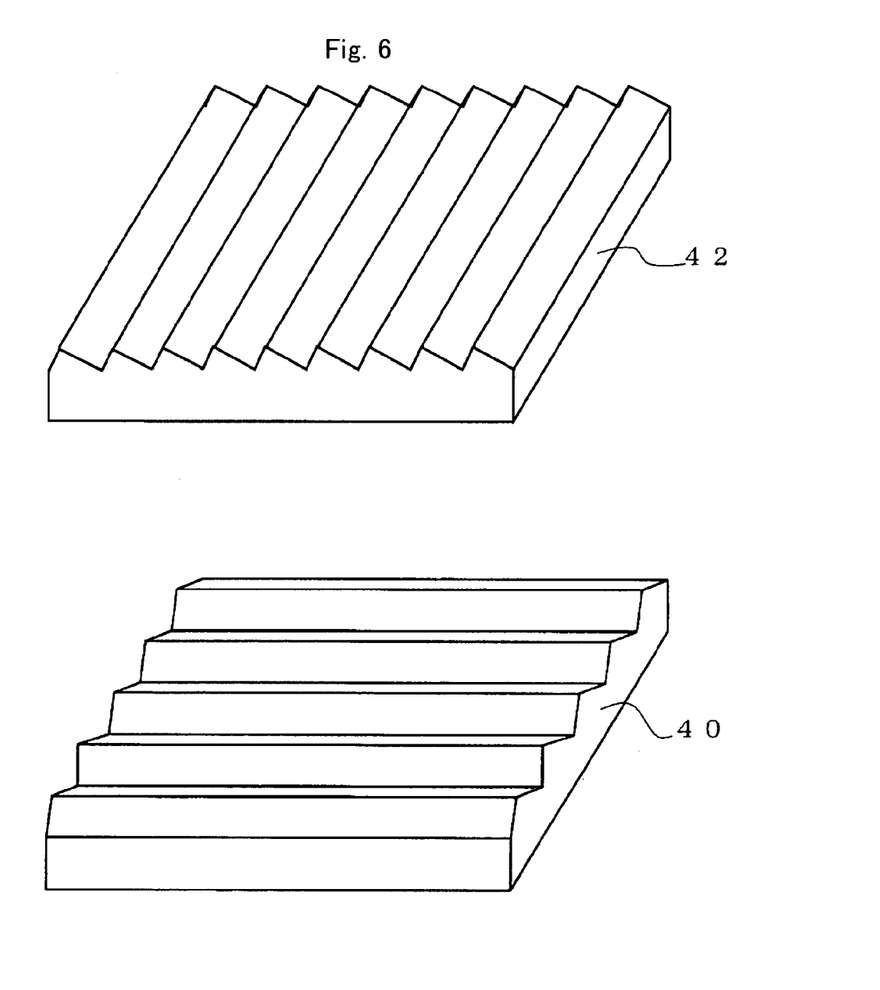
FIG. 6 is a diagram illustrating the layout of prism sheets used in the backlight unit according to the present invention.

Light 48 and 50 emitted from a light source 14 made up of, for example, LEDs travels through a lightguide plate 12 while repeating reflection between the front and back sides of the lightguide plate. While traveling, the light is reflected to be incident on the upper surface (light-emitting surface) of the lightguide plate 12 by grooves 16 provided on the bottom surface thereof. When the angle of incidence relative to the upper surface of the lightguide plate 12 exceeds the critical angle, the light exits out from the upper surface. The light 48 exiting the upper surface of the lightguide plate 12 is diffused by a diffuser sheet 38 and then passes through prism sheets 40 and 42 for the main liquid crystal display panel 44 to impinge substantially perpendicularly on the display panel 44. The prism sheets 40 and 42 are arranged so that the ridges of their prisms extend perpendicular to each other, as shown in FIG. 6.

Figure 8A:
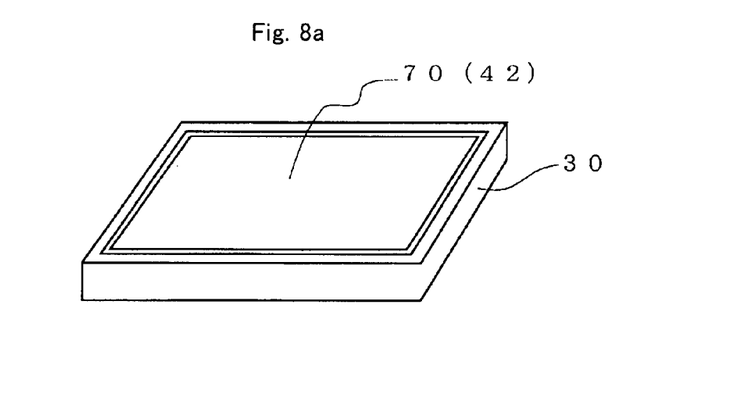
FIG. 8a is a perspective view of the backlight unit according to the present invention as seen from above.
Figure 8B:
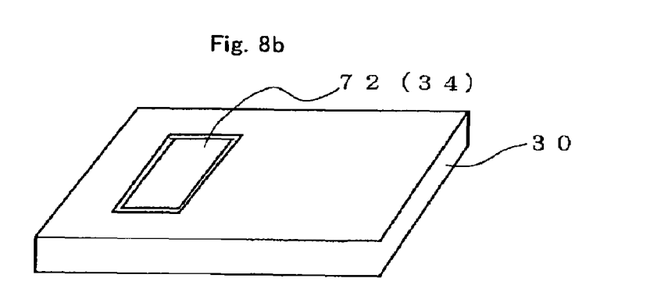
FIG. 8b is a perspective view of the backlight unit according to the present invention as seen from below.

A semitransmitting-reflecting sheet 46 is provided directly below the lightguide plate 12. A holder 30 is provided underneath the semitransmitting-reflecting sheet 46. The holder 30 has an opening 72 provided at a position corresponding to the sub-liquid crystal display panel 36. Prism sheets 32 and 34 for the sub-liquid crystal display panel 36 are placed in the opening 72. Although the holder 30 is shown to be merely a plate-like member in FIG. 4, it is preferable in actual practice that the holder 30 be of a box-like shape as shown in FIGS. 8a and 8b and adapted to hold all components constituting the backlight unit, i.e. the light source 14, the lightguide plate 12, the diffuser sheet 38, the prism sheets 40 and 42 for the main liquid crystal display panel 44, the semitransmitting-reflecting sheet 46, etc.

Light 50 exiting the lower surface of the lightguide plate 12 is split by the semitransmitting-reflecting sheet 46 into transmitted light 52 and reflected light 54. The reflected light 54 is returned to the lightguide plate 12. The transmitted light 52 passes through the prism sheets 32 and 34 to impinge substantially perpendicularly on the sub-liquid crystal display panel 36. The prism sheets 32 and 34 are arranged such that the ridges of their prisms extend perpendicular to each other in the same way as the prism sheets 40 and 42.

It should be noted that at least the upper surface of the holder 30 is formed as a high-light reflectance surface to reflect light transmitted through the semitransmitting-reflecting sheet 46 back to the lightguide plate 12 through the semitransmitting-reflecting sheet 46, except for the opening 72.

Figure 7:
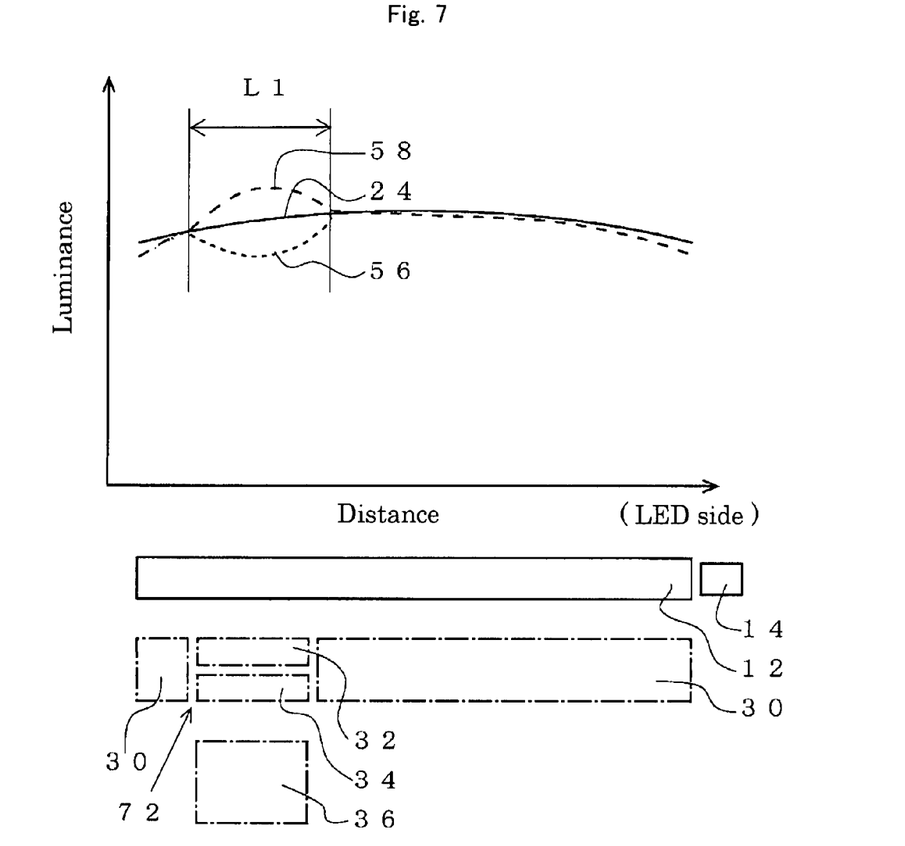
FIG. 7 is a diagram illustrating the luminance distribution in the double-sided emitting backlight unit.

FIG. 7 is a diagram showing the luminance distribution on the main liquid crystal display panel-side light-emitting surface of the double-sided emitting backlight unit shown in FIG. 4. The ordinate axis represents the luminance and the abscissa axis the distance from the light source 14.

Curve 24 shows a favorable luminance distribution. In this regard, however, at the opening 72 of the holder 30, no light is reflected toward the main liquid crystal display panel as done in the other part of the holder 30 where no opening is provided. Therefore, the luminance undesirably lowers as shown by curve 56 at a part $L_1$ of the main liquid crystal display panel-side light-emitting surface that corresponds to the opening 72, as has been stated above.

Figure 5A:
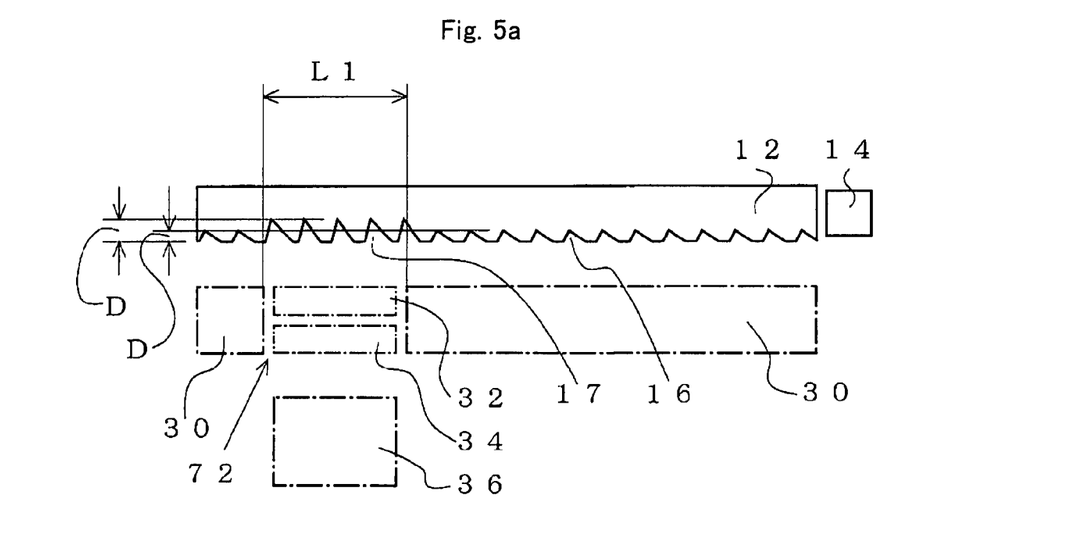
FIG. 5a is a diagram showing an embodiment of the lightguide plate used in the double-sided emitting backlight unit shown in FIG. 4.
Figure 5B:
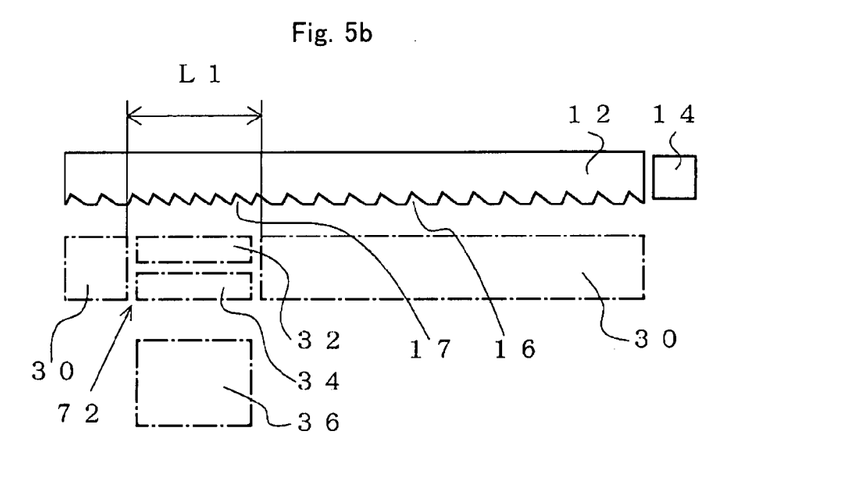
FIG. 5b is a diagram showing another embodiment of the lightguide plate used in the double-sided emitting backlight unit shown in FIG. 4.

FIGS. 5a and 5b show examples of lightguide plates, respectively, aiming at solving the above-described problem.

In FIG. 5a, a lightguide plate 12 has a multiplicity of grooves 16 and 17 provided on the lower surface thereof in the same way as those shown in FIGS. 1a to 1d. The grooves 17 provided in a part $L_1$ of the lightguide plate 12 corresponding to the opening 72 of the holder 30 have a depth $D_2$ and an angle α that are set larger than those of the grooves 16 in the other part of the lightguide plate 12.

A lightguide plate 12 shown in FIG. 5b has grooves 16 and 17 provided on the lower surface thereof. The per-unit number of grooves 17 in the part $L_1$ of the lightguide plate 12 is set larger than the per-unit number of grooves 16 in the other part of the lightguide plate 12.

Because the depth D, angle α and per-unit number of grooves 16 and 17 are set as stated above, the quantity of light per unit area from the lightguide plate 12 is larger in the part $L_1$ corresponding to the opening 72 than in the rest of the lightguide plate 12. Consequently, it becomes possible to achieve a uniform luminance distribution on the main liquid crystal display panel-side light-emitting surface of the backlight unit.

It should be noted that the luminance distribution can be adjusted by properly combining together the three factors explained with reference to FIG. 2, i.e. the per-unit number, depth D and angle α of grooves, in addition to the luminance distribution adjusting methods shown in FIGS. 5a and 5b.

The sub-liquid crystal display panel may be disposed either close to or remote from the light source. In either case, a desired luminance adjustment can be performed.

It is preferable also in the lightguide plates 12 shown in FIG. 5 to set an optimal luminance distribution by varying the above-described three factors with the grooves being situated farther away from the light source 14 in both the part $L_1$ and the other part, as has been stated in connection with FIGS. 1a to 1d.

The invention claimed is:

1. A lightguide plate for a double-sided emitting backlight unit, comprising:
   a first light-emitting surface for illuminating a first liquid crystal display panel disposed to face the first light-emitting surface;
   a second light-emitting surface opposite to the first light-emitting surface to illuminate a second liquid crystal display panel that is smaller than the first liquid crystal display panel and disposed to face the second light-emitting surface; and
   a peripheral surface extending between a periphery of the first light-emitting surface and a periphery of the second light-emitting surface and having a light-receiving surface that receives light from a light source;
   wherein the second light-emitting surface is provided with a multiplicity of grooves extending parallel to the light-receiving surface and each having a triangular section, wherein the grooves in a part of the second light-emitting surface corresponding to the second liquid crystal display panel are different in configuration from the grooves in a rest of the second light-emitting surface so that a quantity of light per unit area emitted from a part of the first light-emitting surface corresponding to the second liquid crystal display panel is larger than that from a rest of the first light-emitting surface.

2. The lightguide plate according to claim 1, wherein the grooves in said part of the second light-emitting surface are deeper than the grooves in the rest of the second light-emitting surface.

3. The lightguide plate according to claim 1, wherein an angle formed between an inclined surface of each of the grooves extending from an apex of the triangular section toward the light-receiving surface and the second light-emitting surface is larger in said part of the second light-emitting surface than in the rest of the second light-emitting surface.

4. The lightguide plate according to claim 1, wherein a number of the grooves per unit length in a direction away from the light-receiving surface is larger in said part of the second light-emitting surface than in the rest of the second light-emitting surface.

5. The lightguide plate according to claim 1, wherein the grooves have a configuration selected from the group consisting of:
   a configuration in which the grooves are deeper and an inner angle of each groove formed between an inclined surface of each of the grooves extending from an apex of the triangular section toward the light-receiving surface and the second light-emitting surface is larger in said part of the second light-emitting surface than in the rest of the second light-emitting surface;
   a configuration in which the grooves are deeper and a number of the grooves per unit length in a direction away from the light-receiving surface is larger in said part of the second light-emitting surface than in the rest of the second light-emitting surface;
   a configuration in which an inner angle of each groove formed between an inclined surface of each of the grooves extending from an apex of the triangular section toward the light-receiving surface and the second light-emitting surface and the second light-emitting surface is larger and a number of the grooves per unit length in a direction away from the light-receiving surface is larger in said part of the second light-emitting surface than in the rest of the second light-emitting surface; and
   a configuration in which the grooves are deeper and an inner angle of each groove formed between an inclined surface of each of the grooves extending from an apex of the triangular section toward the light-receiving surface and the second light-emitting surface and the second light-emitting surface is larger and further a number of the grooves per unit length in a direction away from the light-receiving surface is larger in said part of the second light-emitting surface than in the rest of the second light-emitting surface.

6. A double-sided liquid crystal display apparatus adopting the lightguide plate according to claim 1.

7. A double-sided liquid crystal display apparatus adopting the lightguide plate according to claim 2.

8. A double-sided liquid crystal display apparatus adopting the lightguide plate according to claim 3.

9. A double-sided liquid crystal display apparatus adopting the lightguide plate according to claim 4.

10. A double-sided liquid crystal display apparatus adopting the lightguide plate according to claim 5.

* * * * *